United States Patent [19]
Hamaekers

[11] Patent Number: 5,549,271
[45] Date of Patent: Aug. 27, 1996

[54] VIBRATION CANCELER

[75] Inventor: Arno Hamaekers, Gorxheimertal-Unterfl., Germany

[73] Assignee: Firma Carl Freudenberg, Weinheim, Germany

[21] Appl. No.: 268,771

[22] Filed: Jun. 30, 1994

[30]     Foreign Application Priority Data

Aug. 26, 1993 [DE] Germany .......................... 43 28 667.4

[51] Int. Cl.$^6$ .............................. F16M 7/00; F16F 15/00
[52] U.S. Cl. .......................... 248/621; 248/562; 248/635; 267/141.1; 267/30
[58] Field of Search .................... 248/621, 635, 248/636, 637, 638, 655, 562; 267/152, 30, 159, 161, 160, 141.4, 141, 141.1; 188/378, 379; 403/297, 292, 220, 221, 291; 180/299, 300, 312

[56]           References Cited

U.S. PATENT DOCUMENTS

| | | | |
|---|---|---|---|
| 1,822,026 | 9/1931 | Guy | 403/221 X |
| 2,625,389 | 1/1953 | Signorini | 267/141.1 |
| 2,775,353 | 12/1956 | Tillou | 267/30 |
| 2,854,232 | 9/1958 | Boschi | 267/141.1 X |
| 4,610,420 | 9/1986 | Fukushima et al. | 248/550 |
| 4,790,521 | 12/1988 | Ide et al. | 248/562 X |
| 4,968,010 | 11/1990 | Odobasic | 267/141.1 X |
| 5,267,806 | 12/1993 | Bock | 403/297 X |
| 5,344,116 | 9/1994 | Winkler | 248/677 |

*Primary Examiner*—Karen J. Chotkowski
*Assistant Examiner*—Brian J. Hamilla
*Attorney, Agent, or Firm*—Kenyon & Kenyon

[57]           ABSTRACT

A vibration canceler includes a dimensionally stable inertial mass that is retained by a spring element made of a flexible material. A metal clamping element is mounted to the spring element and the clamping element and the inertial mass are fastened frictionally to one another through a wall of a recess in said inertial mass. The recess may be tapered in the direction of insertion of the spring element, to ensure a good frictional fit.

7 Claims, 1 Drawing Sheet

VIBRATION CANCELER

BACKGROUND OF THE INVENTION

1. Field of the Invention

The present invention concerns a vibration canceler having a dimensionally stable inertial mass that is retained by a spring element made of flexible rubber material.

2. Description of the Related Art

A vibration canceler is shown in U.S. Pat. No. 4,610,420, FIG. 9. The dimensionally stable inertial mass in the device shown in this patent is vulcanized onto a spring element made of flexible rubber material.

SUMMARY OF THE INVENTION

The underlying object of the invention is to further develop a vibration canceler in such a way that it is easier and more economical to manufacture.

To achieve the objects of the present invention, provision is made for a metal clamping element to be mounted to the spring element, and for the clamping element and the inertial mass to be fastened frictionally to one another. This configuration is advantageous because the vibration canceler requires only two separately produced components, such that the spring element and the metal clamping element form a preassembled unit. The metal clamping element can, for example, be vulcanized into the spring element, the clamping element being joined frictionally and nondisplaceably to the inertial mass by elastic and/or plastic deformation. As a result, assembly of the vibration canceler is particularly easy. The inertial mass can consist, for example, of a body cast from a metallic material that is provided with a recess. The clamping element preferably has a shape matched to the recess, and during assembly is pressed into the recess of the inertial mass and thereafter held frictionally in the recess.

According to an advantageous embodiment, the inertial mass can have a projection, and the clamping element can have a pass-through opening that is pressed onto the projection. While the vibration canceler is being assembled, the projection passes through the pass-through opening and provides precise spatial alignment of the components being fastened frictionally to one another. The projection and the pass-through opening cause centering of the two parts with respect to one another.

The projection can have a cross section which increases in the press-on direction, and which can be brought into engagement with a congruently shaped recess of the spring element. The conical shape of the projection causes gradual centering of the inertial mass and spring element relative to one another, since during assembly the projection contacts the recess of the spring element only at portions of its surface. Friction during assembly is therefore comparatively low. Once the fitting process is complete, however, the projection contacts the recess of the spring element over its entire surface under an elastic preload. In addition to the frictionally joining of the clamping element inside the inertial mass, the frictionally engaged connection between the projection and the recess offers additional protection against relative displacement of the inertial mass with respect to the clamping element that is joined to the spring element. It has proven to be particularly advantageous if the projection has the shape of a truncated cone.

The inertial mass can have a recess, the clamping element being pressed into the recess. It is advantageous if no secondary contrivances, for example adhesives or threaded joints, are used to fasten the spring element to the inertial mass. A vibration canceler configured in this manner can be produced economically in large numbers with a short production time.

The recess can have a cross section which diminishes in the press-on direction. The advantage is that improved centering of the inertial mass with respect to the spring element results; according to a preferred embodiment, compression of the clamping element inside the recess of the inertial mass does not occur until the two parts have already been united to the point that the projection of the inertial mass is already covering the opening of the recess of the spring element. This guarantees that the parts can be assembled substantially without jamming.

According to another advantageous embodiment, the clamping element can extend substantially transverse to the lengthwise direction of the projection or the recess, and can have an edge region with a profile deformed opposite to the press-on direction. Assembly of the spring element to the clamping element occurs with comparatively little force because of the edge region deformed opposite to the press-on direction. During assembly, the edge region resiliently deforms radially inwardly. If forces act, for example, on the inertial mass in the press-on direction, or on the spring element opposite to the press-on direction, while the vibration canceler is being used, the fact that the edge region of the clamping element is deformed opposite to the press-on direction causes a wedging effect and enhanced frictional fastening of the parts to one another. This barbed edge region allows immovable fastening of the inertial mass to the spring element during the entire service life of the vibration canceler.

The clamping element can have at least one mounting projection extending beyond the profile of the spring element at the edge. The clamping element can consist, for example, of a substantially circular disk that, as manufactured, has an outside diameter greater than the circular recess of the inertial mass in the region of its narrowest point. This configuration results in largely uniform compression in the radial direction along the entire outer periphery of the clamping element, so that deflection movements and therefore loosening of the frictionally connection between the parts mounted to one another cannot occur. This results in secure fastening over a long service life. If, for example, mounting projections distributed uniformly in the peripheral direction are used, it has proven useful if at least three, preferably five projections, distributed uniformly in the peripheral direction, are provided. Regardless of the direction of any movements that might be introduced radially, this reliably excludes relative displacement of the clamping element with respect to the inertial mass, parallel to the press-on direction, when vibrations related to operation are introduced simultaneously.

The mounting projection can be covered with a coating made of flexible rubber material. With a configuration of this kind, manufacturing tolerances of the clamping element and/or of the recess inside the inertial mass cannot influence assembly of the vibration canceler, which allows simple, automated production of the vibration canceler. It is also advantageous that because the clamping element is completely enveloped in flexible rubber material, contact corrosion between the inertial mass and the clamping element is reliably avoided.

The inertial mass can be produced by sand-casting, and can have no machining in the region of the projection or the recess. It is advantageous here that the surface roughness of the inertial mass resulting from the sand-casting method favors secure fastening of the clamping element within the recess of the inertial mass. When the vibration canceler has been assembled, there is an additional positive hooking effect between the clamping element that is completely enveloped with elastomeric material and the unmachined surface of the recess, and between the unmachined mounting projection of the inertial mass and the recess inside the spring element, which reinforces the frictionally fastening between the clamping element and the inertial mass. Because subsequent machining of the sand-cast inertial mass can be dispensed with, the vibration canceler according to the invention can be produced economically.

BRIEF DESCRIPTION OF THE DRAWINGS

An exemplary embodiment of the vibration canceler of the present invention is depicted schematically in the drawings, and will be described in more detail below.

DETAILED DESCRIPTION OF THE DRAWINGS

Figure 1:
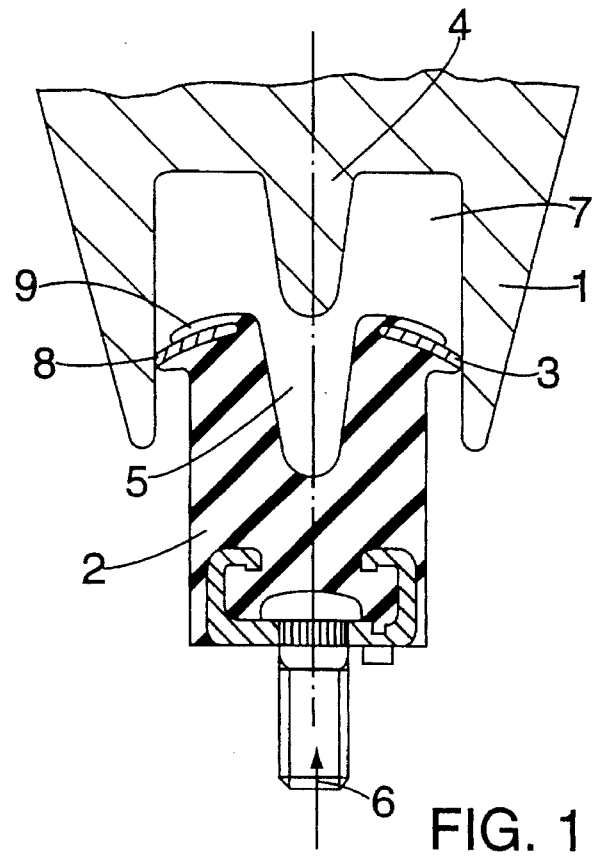
FIG. 1 shows the individual parts of the vibration canceler of the present invention during assembly.
Figure 2:
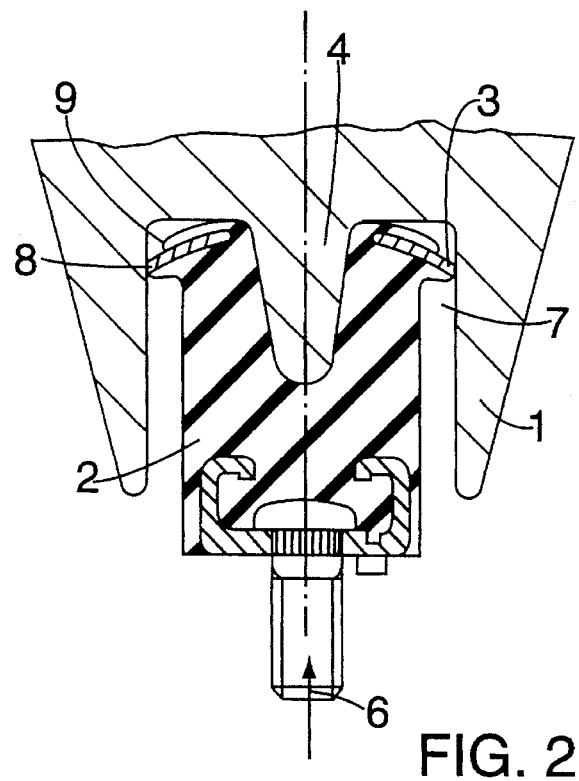
FIG. 2 shows the vibration canceler of the present invention after assembly.

FIGS. 1 and 2 show an exemplary embodiment of a vibration canceler that includes an inertial mass 1, a spring element 2 made of a flexible elastomeric or rubber material, and a metal clamping element 3. The inertial mass can be made of cast iron produced by sand casting, and in a prefered embodiment is not machined subsequent to its production. Spring element 2 completely surrounds a substantially disk-shaped clamping element 3 on the side facing inertial mass 1. Clamping element 3 and the elastomeric material of spring element 2 each have a central recess which has a shape matched to a projection 4 of inertial mass 1. Recess 7 of inertial mass 1 is circular, as are spring element 2 and clamping element 3 enveloped by spring element 2. Recess 7 of inertial mass 1 decreases continuously in cross section in a press-on direction 6, so that the compression of clamping element 3 against the inner walls of inertial mass 1 increases as the clamping element 3 moves in a press-on direction 6. Clamping element 3 is deformed opposite to press-on direction 6 in an edge region 8 (which can be formed as a plurality of projections) that projects beyond the edge of spring. element 2, so as to ensure relatively easy assembly in press-on direction 6 by elastic deformation. If forces act, for example, in the press-on direction 6 on inertial mass 1, the barbed edge region 8 of clamping element 3 results in additional compression of the parts mounted radially inside the recess 7, so that no relative movement occurs between the two parts.

FIG. 1 shows the relative position, during assembly, of inertial mass 1 in relation to spring element 2 and clamping element 3 surrounded by spring element 2. In FIG. 1, clamping element 3 has already been introduced into recess 7 of inertial mass 1, but projection 4 of inertial mass 1 does not yet cover the opening of the recess 5 of spring element 2. The situation depicted in FIG. 1 represents preliminary positioning of the parts as they are inserted into one another.

FIG. 2 shows the vibration canceler in an assembled state. The spring element 2 and clamping element 3 have been introduced in the press-on direction 6 into recess 7 of inertial mass 1 until the end delimitation 9 of spring element 2 contacts the bottom of recess 7. Projection 4 of inertial mass 1 is surrounded under radial preload by spring element 2, which delimits the recess.

I claim:

1. A vibration canceler comprising:

an inertial mass comprising a recess; and a spring element made of a flexible material, said spring element comprising a metal clamping element mounted to said spring element, said metal clamping element being frictionally fastened to a wall of said recess of said inertial mass by being pressed into said recess, thereby preventing said spring element from exiting said recess, said recess having a cross-sectional area which continuously diminishes in a press-on direction.

2. The vibration canceler of claim 1, wherein:

said inertial mass comprises a projection and wherein said clamping element comprises an opening into which said projection extends.

3. The vibration canceler of claim 2, wherein:

said projection has a cross-sectional area which increases in a press-on direction.

4. The vibration canceler of claim 1, wherein:

said clamping element extends substantially transverse to an axial direction of said spring element, and wherein said clamping element has an edge region having a profile deformed opposite to a press-on direction.

5. The vibration canceler of claim 1, wherein:

said clamping element has at least one mounting projection extending beyond a profile of said spring element at an edge of said spring element.

6. The vibration canceler of claim 5, wherein:

said mounting projection is covered with a coating of a flexible material.

7. The vibration canceler of claim 5, wherein:

said inertial mass is sand cast, and wherein said inertial mass is not machined adjacent said projection or adjacent said recess.

* * * * *